July 28, 1959     L. P. CORNWALL     2,896,964
VEHICLE SWAY CONTROL AND OVERLOAD SYSTEM
Filed June 10, 1957
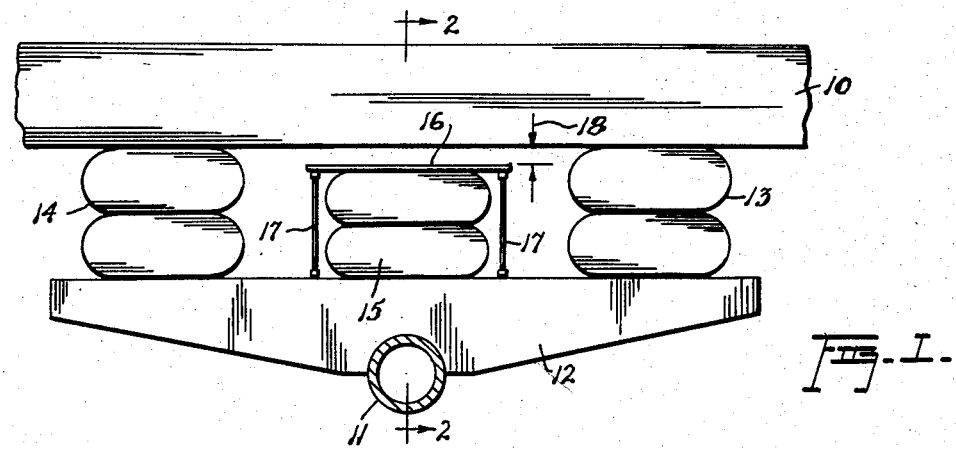
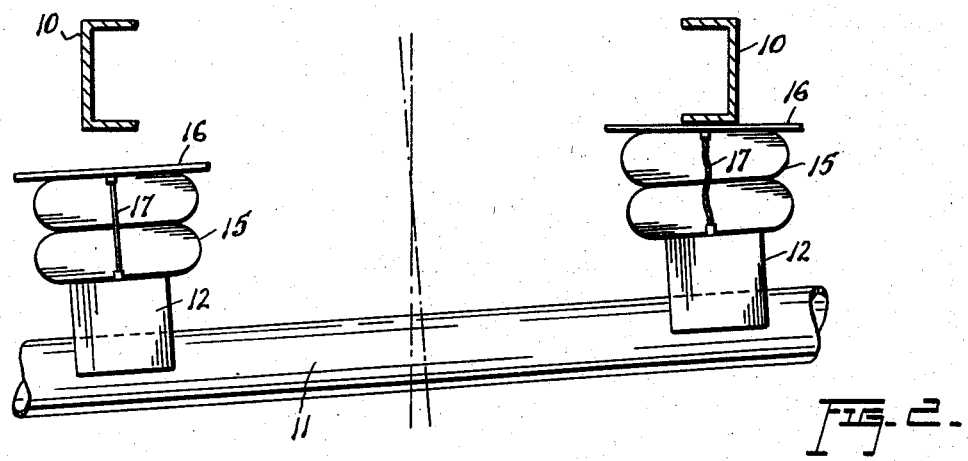
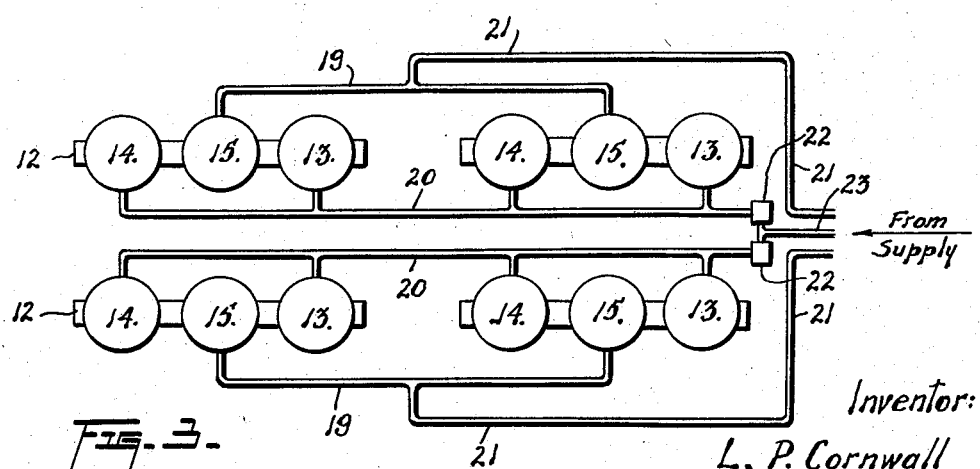
Inventor:
L. P. Cornwall

2,896,964
VEHICLE SWAY CONTROL AND OVERLOAD SYSTEM

Lionel P. Cornwall, Grosse Pointe, Mich.

Application June 10, 1957, Serial No. 664,709

5 Claims. (Cl. 280—104.5)

This invention relates to new and useful improvements in vehicle suspension systems, particularly suspension systems of the type wherein the resilient element is in the form of an air cushion, and the principal object of the invention is to substantially minimize the usual sway to which the vehicle body on the suspension is subjected when the vehicle negotiates a curved path.

The above object is attained by embodying in the suspension system at least two different sets of air cushions, one set of which is under constant load while another set is so arranged that it is actuated only when the first set is partially compressed, such as for example, at a point when sway begins to occur, at which time actuation of the second set of cushions effectively functions to counteract the sway.

As such, the invention eliminates conventional torsion bars, linkage, etc., which frequently became out of adjustment or otherwise inoperative. Other advantages of the invention reside in its simple construction, dependable operation, and in its adaptability for use on vehicles of various types.

With the foregoing more important objects and features in view and such other objects and features as may become apparent as this specification proceeds, the invention will be understood from the following description taken in conjunction with the accompanying drawings, wherein like characters of reference are employed to designate like parts, and wherein:

Figure 1 is a fragmentary side elevational view of the invention in its normal position;

Figure 2 is a cross-sectional view, taken substantially in the plane of the line 2—2 in Figure 1 and showing the device in operation to control sway; and Figure 3 is a schematic plan view of the air line connections used in the invention.

While the invention is adaptable for use with vehicles of various types, it is particularly well suited for embodiment in relatively heavy vehicles such as trucks and busses utilizing tandem rear axles. The accompanying drawings illustrate the invention in such an environment, it being understood however that the use of the invention is not restricted thereto. For simplicity of illustration, only one axle has been shown in Figures 1 and 2, the arrangement being duplicated for tandem axles, as will be understood.

Referring now to the accompanying drawings in detail, the numerals 10 designate the usual two side members of a vehicle frame, while the axle suspended therefrom is shown at 11. In accordance with the invention, a pair of elongated axle members 12 are disposed longitudinally under the respective frame side members 10 and have the axle 11 secured thereto in any suitable manner.

Pairs of conventional air cushions 13, 14 are interposed between the respective axle members 12 and the frame side members 10, there being a cushion 13 adjacent one end and a cushion 14 adjacent the other end of each axle member, as shown. The cushions 13, 14 have their lower ends in abutment with the axle members while their upper ends abut the frame side members, so that these cushions are constantly under load.

However, the invention also embodies another pair of air cushions 15 which are interposed between the axle members 12 and the frame side members 10 and disposed between the cushions 13, 14, one of the cushions 15 being provided for each axle member, as illustrated.

The lower ends of the cushions 15 are in abutment with the axle members, but means are provided for limiting the extent of vertical expansion of these cushions so that their upper ends are spaced downwardly from the frame side members 10 when the cushions 13, 14 are of normal height. These means comprise a pair of flat plates 16 which are positioned at the top of the cushions 15 and are connected to the axle members 12 by suitable flexible elements 17, such as for example, lengths of chain or cable. The elements 17 are of such length as to cause the plates 16 to be spaced downwardly from the side members 10 when the cushions 13, 14 are of normal height, this downward spacing being indicated at 18. The tendency of the cushions 15 to expand vertically under pressure of air therein, of course, causes the upper ends of these cushions to abut the underside of the plates 16, thus maintaining the elements 17 taut.

When the vehicle negotiates a curved path and is subjected to the usual side sway, the cushions 13, 14 at the side of the vehicle which is at the outside of the curve will become compressed and the plate 16 on the same side will come in contact with the adjacent frame side member 10, so that any further compressive force on this side will operate to also compress the cushion 15. This, in turn, will counteract the compressive force so that swaying of the vehicle will be substantially minimized, if not completely eliminated.

As this controlling action occurs at the side of the vehicle at the outside of the curve, the cushions 13, 14 at the opposite side will expand somewhat, but expansion of the cushion 15 therebetween will be prevented by the aforementioned means 16, 17.

Means are provided for maintaining air pressure in the cushions 13, 14 independent of the pressure in the cushions 15, as is shown schematically in Figure 3 wherein it will be noted that air lines 19 connect together the two cushions 15 at each side of two tandem axle units, while air lines 20 connect together the four cushions 13, 14 at each side. The lines 19 communicate with conduits 21 leading from a suitable source of compressed air, while the lines 20 communicate with suitable valve means 22 which, in turn, have a conduit 23 leading from the compressed air source. The valve means 22 are adjustable so as to pre-set the air pressure in the cushions 13, 14 as required for a predetermined normal height of the frame side members 10 above the axle members 12, which arrangement also facilitates an adjustment of the space 18, if desired, while the length of the elements 17 remains constant. The pressure of air in the cushions 15 may be controlled independently of the pressure in the cushions 13, 14, thus varying the force with which the cushions 15 counteract the tendency of the vehicle to sway.

While in the foregoing there has been described and shown the preferred embodiment of the invention, various modifications may become apparent to those skilled in the art to which the invention relates. Accordingly, it is not desired to limit the invention to this disclosure and various modifications may be resorted to, such as may lie within the spirit and scope of the appended claims.

What is claimed as new is:

1. In a vehicle suspension system, the combination of a frame including a pair of spaced side members, a pair of elongated axle members disposed longitudinally under the respective side members of said frame, a first pair of air cushions interposed between the respective axle members and frame side members and in constant abutment therewith, a second pair of air cushions disposed in tandem with the first pair of air cushions and interposed between the respective axle members and frame side members, and means for compressibly maintaining the second pair of cushions at a maximum height of less than the normal height of the first pair of cushions whereby the cushions in the second pair may become actuated only when the cushions in the first pair are partially compressed.

2. The system as defined in claim 1 wherein the lower ends of the second pair of cushions are in abutment with the respective axle members, said means maintaining the upper ends of the second pair of cushions in spaced relation from the respective frame side members when the cushions in the first pair are at normal height.

3. In a vehicle suspension system, the combination of a frame including a pair of spaced side members, a pair of elongated axle members disposed longitudinally under the respective side members of said frame, a first pair of air cushions interposed between the respective axle members and frame side members and in constant abutment therewith, a second pair of air cushions disposed in tandem with the first pair of air cushions and interposed between the respective axle members and frame side members, a pair of plates provided at the upper ends of the second pair of cushions, the lower ends of the second pair of cushions being in abutment with the respective axle members, and flexible elements extending from said axle members to said plates, said flexible elements being of such length as to cause said plates to be spaced downwardly from said frame side members when the cushions in the first pair are at normal height, whereby the cushions in the second pair may become actuated only when the cushions in the first pair are partially compressed.

4. The system as defined in claim 3 together with means for maintaining air pressure in the first pair of cushions independently of the cushions in the second pair.

5. In a vehicle suspension system, the combination of a frame, including a pair of spaced side members, a pair of axle members disposed under the respective side members of said frame, a first pair of air cushions interposed between the respective axle members and said frame side members and in constant abutment therewith, a second pair of air cushions interposed between the respective axle members and the frame side members, the maximum height of the second pair of cushions being less than the normal height of the first pair of cushions, and means for compressibly maintaining said second pair of cushions at a maximum height of less than the normal height of the first pair of cushions, whereby the cushions in the second pair may become actuated only when the cushions in the first pair are partially compressed.

References Cited in the file of this patent

UNITED STATES PATENTS

| 1,436,144 | Bernat | Nov. 21, 1922 |

FOREIGN PATENTS

| 524,287 | Great Britain | Aug. 2, 1940 |